United States Patent [19]
Kanai et al.

[11] 3,883,311
[45] May 13, 1975

[54] REACTION CRYSTALLIZER

[75] Inventors: Toshio Kanai, Yokohama; Masaaki Noguchi; Hiroshi Yanagioka, both of Tokyo; Yosio Kogawa, Yokohama; Susumu Kondo, Kawasaki, all of Japan

[73] Assignee: Chiyoda Chemical Engineering & Construction Co., Ltd., Yokohama, Japan

[22] Filed: Sept. 22, 1972

[21] Appl. No.: 291,292

[30] Foreign Application Priority Data
Sept. 23, 1971 Japan.................. 46-74425

[52] U.S. Cl. .............................. 23/273 R; 23/285
[51] Int. Cl. ...................... B01d 9/00; B01j 1/00
[58] Field of Search .............. 23/273 R, 301 R, 285; 62/58

[56] References Cited
UNITED STATES PATENTS

| | | | |
|---|---|---|---|
| 2,045,301 | 6/1936 | Langer | 23/301 R |
| 2,409,790 | 10/1946 | Otto | 23/273 R |
| 2,424,206 | 7/1947 | Otto | 23/273 R |
| 2,801,907 | 8/1957 | Scott | 23/273 R |
| 3,193,361 | 7/1965 | Niedner | 23/273 R |
| 3,251,192 | 5/1966 | Rich et al. | 62/58 |

*Primary Examiner*—Norman Yudkoff
*Assistant Examiner*—S. J. Emery
*Attorney, Agent, or Firm*—Kurt Kelman

[57] ABSTRACT

In a reaction crystallizer provided at the upper portion thereof with a suspension zone and at the lower portion thereof with a classification zone, the said suspension zone comprises an outer mother liquor chamber adapted to separate a crystal slurry into a dense slurry and a clear mother liquor by virtue of the difference in specific gravity, a means for circulating a part of the clear mother liquor in the said mother liquor chamber into the classification zone, an inner circulation chamber enclosed within the said mother liquor chamber, a reaction chamber enclosed within the said circulation chamber and adapted to receive therein reactants being introduced, and a means for introducing air upwardly into the reaction chamber so as to circulate the dense slurry produced in the reaction chamber convectively and suspend the same between the said reaction chamber and the circulation chamber.

On the other hand, the classification zone comprises a crystal discharge passage and a means for introducing air into the suspension zone.

The fine crystals among the crystals produced in the suspension zone and falling into the classification zone are circulated and retained in the reaction chamber cooperatively by the clear mother liquor and air introduced into the classification zone so that, the crystals therein grow in a fixed size. Thus, only coarse crystals fall against the ascending current of said clear mother liquor and are discharged from the crystal discharge passage.

4 Claims, 2 Drawing Figures

3,883,311
FIG. 1
FIG. 2
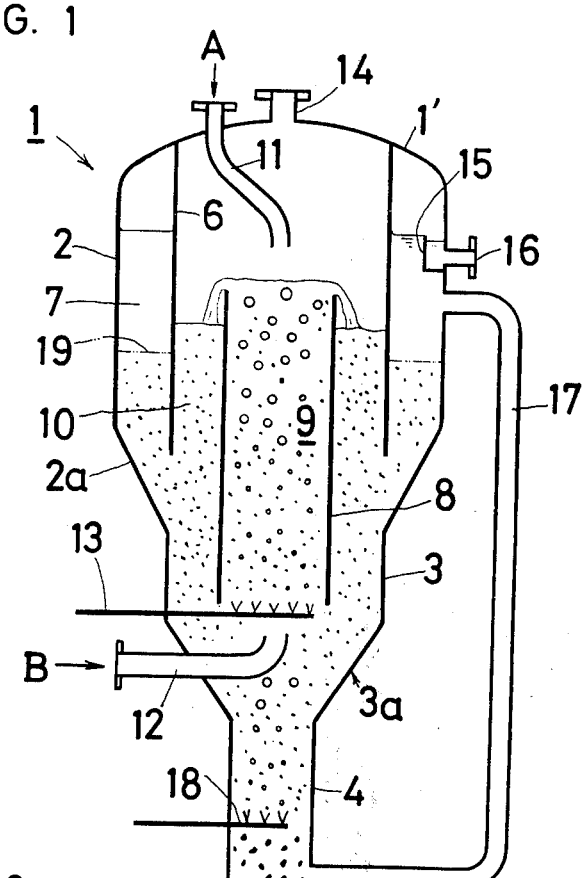
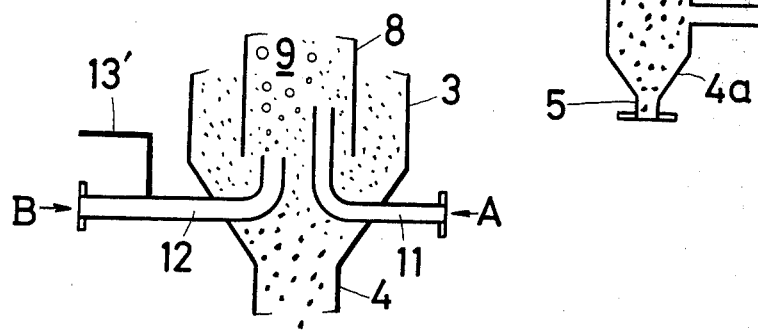

REACTION CRYSTALLIZER

This invention relates to a reaction crystallizer. More particularly, this invention relates to a device for continuously obtaining crystals having a relatively large and, desirably, uniform crystal size, i.e., a device which proves to be particularly suitable for obtaining solid crystals formed in consequence of a chemical reaction such as, for example, crystals of gypsum formed by the reaction of limestone with the aqueous solution of sulfuric acid.

In reaction crystallization, it is generally difficult to obtain crystals of a large crystal size as compared with crystallization by cooling or evaporation. The separation of solid-liquid phases is difficult to accomplish. Even after separation, the crystals are not easy to handle because of their powdery form. Numerous studies have to date been continued in search for methods capable of obtaining coarse crystals which are uniform in crystal size and quality. Efforts are continuing to develop devices which are in conformity with varying requirements dictated by the results of researches.

One of the reasons which makes it difficult to obtain crystals of a large grain size by reaction crystallization resides in the fact that the reaction velocity is self-regulative and, therefore, is difficult to regulate compared with the cooling velocity and the evaporation velocity. Further, the reaction velocity is generally high. The velocity of the formation of crystal nuclei which is roughly proportional to the reaction velocity, therefore, proves to be extremely high as compared with the velocity of the growth of crystals which relies on the phenomenon of diffusion. Thus, the increase in the number of crystal nuclei will have a predominating effect.

In the case of continuous crystallization, seed crystals are already in existence. When the supersaturated solution has its concentration lowered to the equilibrated solubility, the relationship expressed by the following formula generally comes into existence.

$$- dc/dt = K_s S(C - C_o)^m + K_n(C - C_o)^n \quad (1)$$

wherein, the first term in the right member of this equation represents the velocity of the decrease in concentration due to the growth of seed crystals and the second term represents the velocity based on the formation of crystal nuclei; and $C$ denotes concentration, $C_o$ solubility, $m$ and $n$ each the order of reaction, $S$ the total surface area to be determined by the size of seed crystals and the density of seed crystals and $K_s$ and $K_n$ the velocity constants for seed crystals and crystal nuclei respectively.

Formula (1) implies that, in order to obtain coarse crystals continuously, occurrence of crystal nuclei and extraction of crystals should be balanced against each other so as to preclude excess occurrence of new nuclei and permit crystallization to proceed solely on seed crystals as an overall effect. In reaction crystallization, however, the second term generally has a value substantially greater than that of the first term in the right member of the equation of Formula (1). This explains why it is difficult to obtain large crystals by reaction crystallization.

The second term inevitably acquires a greater value under normal conditions because $K_s$ and $K_n$ are velocity constants concerning the phenomenon of diffusion and the phenomenon of reaction respectively. In the case of crystallization by evaporation or cooling, the factor $K_n$ is governed by the velocity of evaporation or the velocity of cooling. This means that it is relatively easy to control the value of $K_n$ and it is made possible to reduce the value of the second term. It is, therefore, relatively easy to obtain coarse crystals by this type of crystallization.

In the case of the reaction crystallization, therefore, it is the primary requirement that the degree of supersaturation $(C - C_o)$ should be decreased so as to lower the velocity of the occurrence of crystal nuclei, that the surface area $S$ should be increased as by heightening the crystal density so as to promote the growth of seed crystals, that the velocity constant $K_s$ should be increased by intensifying the agitation and that the retention time should be sufficiently lengthened until the crystalline growth reaches equilibrium. This invention aims to fulfil the various conditions mentioned above. Therefore, the object of this invention is to provide a reaction crystallizer which is provided with a classification means adapted to return fine crystals to the reaction system for additional retention therein and extract only coarse crystals out of the system and which is designed to utilize air as the motive force for agitation so as to protect crystals against otherwise possible breakage.

To be more specific, the reaction crystallizer of this invention is provided at the upper portion with a suspension zone and at the lower portion with a classification zone: The said suspension zone comprises an outer mother liquor chamber having a lower open end, an inner circulation chamber, a reaction chamber enclosed with the said circulation chamber and having upper and lower open ends, and a means adapted to deliver air upwardly to the said reaction chamber. The classification zone is provided with a passage for discharge of crystals and is communicatively connected upwardly to the said reaction chamber. The said mother liquor chamber is connected to the classification zone outside the system. The classification zone is also provided with a means for introducing air within. The slurry which is formed by the reaction of reactant A and reactant B is first let to the mother liquor chamber to be gravitationally divided into a clear mother liquor and a dense slurry. The reaction is allowed to proceed continuously within the dense slurry, namely the portion where the crystal density is large. The dense slurry is circulated in a large volume by means of the air delivered to the suspension zone so as to dilute the reactants being newly supplied and thus accomplish the purpose of lowering the degree of supersaturation. The agitating effect produced by the circulation of a large volume of dense slurry is utilized for promoting the transfer of materials. The excess of fine crystals are returned to the reaction zone by virtue of the upward current which is generated cooperatively by the clear mother liquor being delivered to the classification zone and the ascending air bubbles. The classifying action consequently obtained provides fine crystals with a longer retention time and coarse crystals with a shorter retention time. Thus, crystals having a large and uniform grain size can be extracted from the system.

Other object and features of this invention will become apparent from the following detailed description given with reference to the accompanying drawing, in which;

FIG. 1 is a sectional side view of one embodiment of a reaction crystallizer according to the present invention, and FIG. 2 is a sectional side view of another embodiment according to the present invention.

A vertical reaction tank 1 having a cylindrical cross section comprises an upper barrel 2 having the largest diameter, a middle barrel 3 having a diameter smaller than that of the barrel 2 and a lower barrel 4 having a diameter still smaller than that of the middle barrel 3. The axes of the barrels 2, 3 and 4 coincide with the axis Y-Y of the tank 1. In other words, these barrels are concentric with one another as well as with the tank. Inverted conical planes 2a and 3a are inserted to fill the gaps between the upper barrel 2 and the middle barrel 3 and between the middle barrel 3 and the lower barrel 4 respectively. The lower end of the lower barrel 4 is gradually constricted to form an inverted conical plane 4a, which communicates with a crystal discharge passage 5.

Inside the said upper barrel 2, a first inner cylinder 6 having a diameter smaller than that of the upper barrel 2 is attached, facing downwardly, to the inside of the top wall 1' of the tank 1 in such way that, in conjunction with the upper barrel, the lower end thereof forms an annular mother liquor chamber 7 having a lower open end. A second cylinder 8 having a diameter smaller than that of the middle barrel 3 or the first inner cylinder 6 and larger than that of the lower barrel 4 is disposed inside the middle barrel 3, with the upper end thereof thrust into the first inner cylinder 6. The second inner cylinder forms therein a reaction chamber 9 having upper and lower open ends. In conjunction with the first inner cylinder 6 and the middle barrel 3, this second inner cylinder also forms a circulation chamber 10 of an annular shape having upper and lower open ends. The said first and second inner cylinders 6 and 8 have axes which are also concentric with the said axis of the tank 1.

One of the reactants, A, is fed downwardly through a feed pipe 11 into the reaction chamber 9 and the other reactant B is fed upwardly into the reaction chamber 9 in conjunction with air or an inert gas (hereinafter referred to collectively as "air"). To permit the reactant B to be fed upwardly in conjunction with air into the reaction chamber 9, the embodiment illustrated in FIG. 1 has a feed pipe 12 for delivery of the reactant B and an air distributor 13 disposed separately of each other. In an alternative design, an air blower tube 13' may be connected to the feed pipe 12 as illustrated in FIG. 2 so as to permit air to be mixed in advance with the reactant B, with the result that air will be delivered in the form of fine air bubbles while entraining the reactant B from the feed pipe. In the top wall 1' of the tank 1, an air vent 14 is formed at a position falling within the area of the top wall enclosed with the first inner cylinder, so that air amy be discharged from inside the tank.

The mother liquor chamber 7 is provided at an upper portion with a discharge pipe 16 for extracting from the tank interior the portion of clear mother liquor overflowing a weir 15. At a level below the base of the discharge pipe 16, the mother liquor chamber 7 is communicatively connected to the lower barrel 4 by means of an outer pipe 17. Inside the lower barrel 4, an air distributor 18 adapted to deliver air into the barrel interior is disposed at a position higher than the level at which the outer pipe 17 opens into the lower barrel 4.

According to the illustrated preferred embodiment, the suspension zone is composed of the outer mother liquor chamber 7, the circulation chamber 10 formed on the inside thereof, the reaction chamber 9 enclosed with the said circulation chamber 10 and the air distributor 13 serving to deliver air upwardly to the said reaction chamber 9 or the air blower tube 13'. The reactants A and B are caused to react inside the reaction chamber 9. The classification zone is composed of the lower barrel 4 of the tank 1. It is communicatively connected upwardly to the reaction chamber 9. It is also connected to the mother liquor chamber 7 of the suspension zone by means of the outer pipe 17. The air distributor 18 is provided at a position higher than the level at which the clear mother liquor is delivered to the classification zone via the said outer pipe 17. As is clear from Formula (1), occurrence of nuclei increases when the reactants A and B are mixed with each other while their concentrations are retained at the original high values. For this reason, the device illustrated in FIG. 1 is so designed that the reactant A will be introduced downwardly and the reactant B upwardly, into the reaction chamber 9, in which they will gradually be mixed as they are diluted with the liquid being circulated through the reaction chamber and the circulation chamber. So far as the reactants can be diluted with a large volume of liquid in circulation, the said reactants A and B may be introduced downwardly or upwardly in one same direction, though separately of each other.

As the device is set to operation, the crystal slurry resulting from the reaction between the reactants A and B forms an interface 19 of crystal layer within the mother liquor chamber 7 by means of gravitational attraction and is separated into a clear mother liquor and a dense slurry. The mother liquor is delivered via the outer pipe 17 into the interior of the lower barrel 4, The portion of mother liquor which overflows the weir 15 is withdrawn out of the system through the discharge passage 16. The dense slurry is convectively circulated through the reaction chamber 9 and the circulation chamber 10 by virtue of the difference in density which is created between the said two chambers 9 and 10 by the air being blown upwardly into the reaction chamber 9. Crystals are thus suspended in a high density within this convective current.

Consequently, the reactants A and B which are supplied either continuously or intermittently are brought into union on seed crystals which are suspended densely in the circulating current within the reaction chamber 9, whereby crystals are allowed to grow to a large grain size. The part of the reactants A and B which participate in the occurrence of nuclei forms very fine crystals. These fine crystals are prevented from descending by the upward flow of the outer current through the outer pipe 17 which is generated by the cooperation between the mother liquor being introduced into the lower barrel interior through the outer pipe 17 and the air being introduced via the air distributor 18. They are forced to remain within the system and achieve growth to a large grain size. When the fine crystals have thus grown to a grain size large enough to overcome the said upward flow of the outer current, they fall and collect at the discharge passage through the interior of the lower barrel 3 which serves as a fine crystal returning zone. Coarse crystals thus collected at the passage are then withdrawn through the passage 5.

The positions at which the reactants A and B are delivered are above and below the reaction chamber 9 in which the circulating current containing therein densely suspended seed crystals has a predominating quantity. These positions are separated vertically by a suitable distance from the boundaries of the said chamber. If the reactants A and B were mixed while they were still in high concentration, then the occurrence of nuclei would increase as is evident from the aforesaid Formula (1). In the present device, however, they are diluted by the circulating current and are caused to be mixed with each other gradually. Thus, this device is free from the disadvantage of excess occurrence of crystal nuclei.

As is clear from the preceding description, the device of the present invention functions to prevent excess occurrence of nuclei in the crystal suspension zone in the upper part thereof and additionally functions to ensure growth of crystals over seed crystals, with the result that crystals will be permitted to achieve growth to a large grain size. It also functions to classify crystals by size, so that within the fine crystal returning zone, fine crystals will be prevented from descending. By virtue of all these functions, this device can obtain crystals of a large and uniform grain size. Moreover, the upward flow is generated inside by utilizing air or some other suitable inert gas as the motive power without recourse to any mechanical means. Thus, the device benefits by the fact that there is no possibility of crystals being broken by mechanical shocks and the fact that the device does not use any part susceptible of mechanical trouble.

When the device of this invention is utilized in a system designed to produce gypsum by the reaction of the aqueous solution of sulfuric acid with such calcium-containing substance as limestone, for example, there is enjoyed an additional advantage that the sulfuric acid within the system is converted into thoroughly oxidative sulfuric acid by having air blown therein, with the result that steel or low-grade stainless steel generally assumes a passive state. Such metal, therefore, comes to withstand the corrosive action of sulfuric acid and can be used as the material for the equipment. This fact forms an economic advantage for the device of this invention.

Since the clear mother liquor is withdrawn from the upper portion of the device, the concentration of the dense slurry layer can be maintained at a substantially constant level. It follows as a consequence that even from sulfuric acid of a relatively low concentration, crystals of a fixed quality can be obtained while the quantity of the clear mother liquor alone is increases.

The device of this invention can be designed in various ways to suit the reactants A and B to be used. There are certain conditions which are commonly applicable to all possible designs of the device. The first condition concerns the amount of air to be blown in. Practically the highest air bubble retention ratio and, consequently, the highest circulation ratio can be obtained by blowing air into the reaction chamber 9 at a spatial velocity of about 300 $Nm^3/m^2.hr$. As regards the second condition which pertains to the upward current of mother liquor, the ascending rate within the mother liquor chamber 7 can be fixed at a value small enough to prevent fine crystals from floating upwardly. As the third condition, the amount of the mother liquor flowing through the outer pipe 17 can be fixed so as to give a flow rate at which the mother liquor is allowed to ascend as far as the upper barrel while entraining therewith fine crystals required to be sent back. The amount of air introduced via the air distributor 18 to be utilized for reversing the flow of the fine crystals can be fixed, depending on existing conditions, at a value to give a driving force required for generating the upward flow of mother liquor. Generally, a stable upward current of mother liquor can be obtained by fixing the spatial velocity of air in the range of between 20 and 100 $Nm^3/n^2.hr$. The crystal concentration of the dense slurry is desired, according to Formula (1), to be as large as permissible. It has its own limit, however, because of the factor of fluidity. It may be selected in the range of between 300 and 600 g/liter.

We claim:

1. A reaction crystallizer which comprises in combination a closed vertical reaction tank having a cylindrical cross section and an upper barrel having the largest diameter, a middle barrel having a smaller diameter than said upper barrel and a lower barrel defining a classification zone having a smaller diameter than said middle barrel, a first inner cylinder suspended from the top of the reaction tank and having a diameter smaller than that of the upper barrel, said first inner cylinder defining an annular mother liquid chamber with the upper barrel, a second cylinder defining a reaction chamber having a diameter smaller than that of the middle barrel and the first inner cylinder, said second cylinder being disposed from within the first inner cylinder and to the middle barrel, said second cylinder defining an annular circulation chamber with the inner surface of the said first inner cylinder, means for introducing a first reactant to the second cylinder, means for introducing air to an open bottom portion of the second cylinder, and means for introducing a second reactant to the second cylinder, means for introducing air to the lower barrel, a crystal discharge passage disposed at the lower portion of the lower barrel, recycle pipe disposed for passing mother liquor from the mother liquor chamber to the lower barrel defining the classification zone, a discharge passage for overflow of mother liquor disposed near the upper portion of the upper barrel, and a gas discharge disposed on top of the reaction tank, whereby fine crystals produced in the reaction tank remain suspended, with coarse crystals passing to the classification zone.

2. The reaction crystallizer according to claim 1, wherein the means for introducing air to the bottom open portion of the second cylinder is disposed above the means for introducing the second reactant.

3. The reaction crystallizer according to claim 1, wherein the reactants are introduced countercurrently to the second cylinder defining the reaction chamber.

4. The reaction crystallizer according to claim 1, wherein the reactants are introduced to the open bottom portion of the second cylinder defining the reaction chamber.

* * * * *